United States Patent [19]

Koning et al.

[11] 4,391,187

[45] Jul. 5, 1983

[54] BELT-TENSIONING SYSTEM FOR ROUND BALERS

[75] Inventors: Richard W. Koning; Gerald F. Meiers; Henry D. Anstey, all of Ottumwa, Iowa

[73] Assignee: Deere & Company, Moline, Ill.

[21] Appl. No.: 308,223

[22] Filed: Oct. 5, 1981

[51] Int. Cl.³ .................... B30B 5/06; A01D 39/00
[52] U.S. Cl. .................................... 100/88; 56/341
[58] Field of Search ................... 100/88, 89, 5, 7; 56/341, 342, 343, 344

[56] References Cited

U.S. PATENT DOCUMENTS

| | | | |
|---|---|---|---|
| 3,722,197 | 3/1973 | Vermeer | 56/341 |
| 4,121,513 | 10/1978 | Kopaska | 100/88 |
| 4,252,057 | 2/1981 | Gaeddert et al. | 56/341 |
| 4,258,619 | 3/1981 | Gaeddert | 56/341 X |
| 4,336,750 | 6/1982 | White et al. | 100/88 |

Primary Examiner—Peter Feldman
Attorney, Agent, or Firm—Henderson & Sturm

[57] ABSTRACT

A round baler of typical construction has a novel belt and roll system arranged to provide a pair of lower rolls from which oppositely running stretches extend upwardly to a pair of closely spaced apart intermediate rolls which are journaled on a carrier means which in turn is movable upwardly as bale size increases between the oppositely running stretches. The bale is confined below the two intermediate rolls while other stretches of the belt are trained about additional rolls enabling deflecting of the chamber-forming stretches during bale formation. Control means is provided to act on the carrier to control upward movement of the carrier means and thus to control bale density in an improved and efficient manner. The control means further includes hydraulic means tied in with the hydraulic means that controls the bale-discharge gate.

10 Claims, 6 Drawing Figures

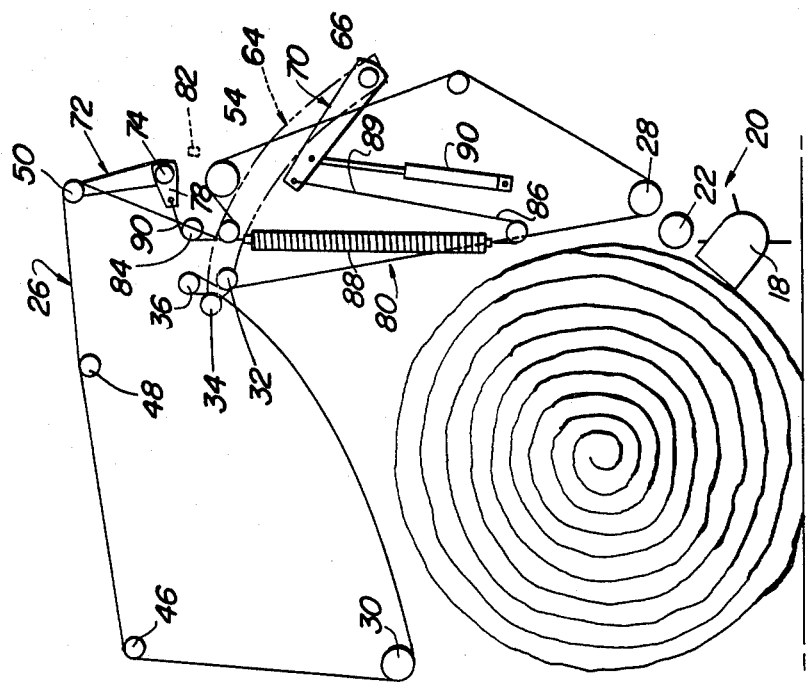

BELT-TENSIONING SYSTEM FOR ROUND BALERS

BACKGROUND OF THE INVENTION

The typical round baler includes a main frame adapted to advance over a field, as by being drawn by a tractor. Such baler will employ a belt and roll system arranged so that portions or stretches of the belt operate among several rolls to define a bale-forming chamber in which the cylindrical bale is formed as opposed stretches of the belt move in opposite linear directions. Provision must be made for enabling certain of the rolls to change position so as to supply belt portions to the ever-increasing bale-forming chambers and such provision should include means for maintaining proper bale tension and thus bale density as well as for taking up slack in the belt when the completed bale is discharged, as via a rear-dump gate. It has been heretofore found difficult to control the expansion of the bale chamber and resort has often been had to various kinds of guides and shields in addition to the rolls. According to the present invention, bale chamber control, along with the maintenance of proper belt tension and bale density, is achieved in a simple manner by the provision of a pair of intermediate rolls disposed in such manner as to substantially close the top of the bale chamber and to confine bale formation below these rolls and the lower rolls at the inlet to the chamber. Control means is arranged to act on these rolls in such manner as to attain proper density without unduly increasing power consumption. The control means includes a combination of a hydraulic system and a springflexible tension means system, with provision for adjustment. The hydraulic system is tied in with the hydraulic means that operates the bale discharge gate. Further features will appear as the disclosure progresses in connection with a preferred embodiment of the invention.

DESCRIPTION OF THE DRAWINGS

FIG. 4 is likewise similar but shows a still further stage of operation.

FIG. 5 is also similar and shows the completed bale during discharge thereof from the bale-forming mechanism.

DETAILED DESCRIPTION OF A PREFERRED EMBODIMENT

Figure 1:
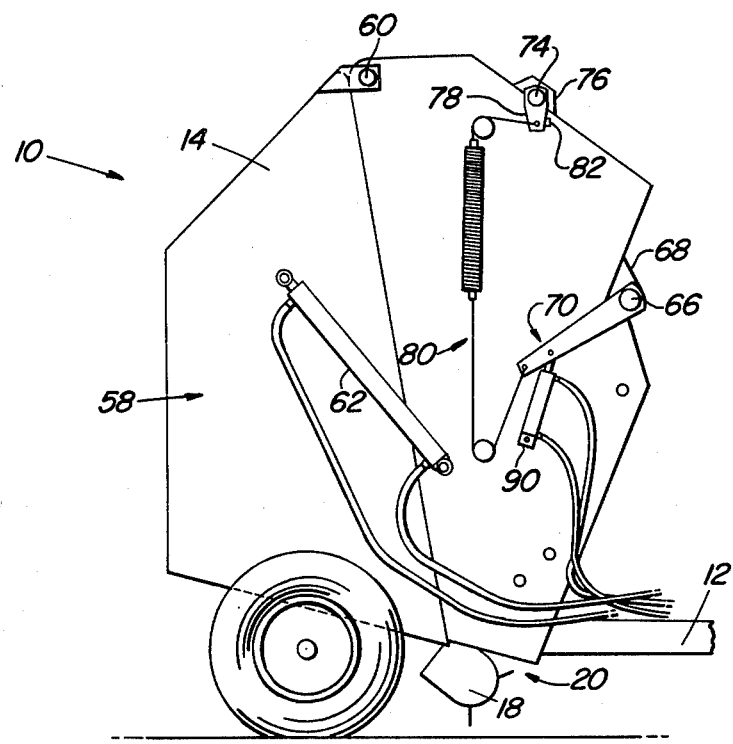
FIG. 1 is a side elevation of a typical round baler to which the invention is adapted.

FIG. 1 is referred to first for a general description of what may be regarded as a typical round baler design, having a main frame 10 including a draft tongue 12 for connection to a tractor (not shown) by means of which the machine is caused to advance over a field of previously harvested crops. The main frame has opposite fore-and-aft, vertical side walls 14 and 16, the latter of which of course does not appear in FIG. 1 and the former of which has been removed in FIGS. 2 through 5 in order to expose interior components. A typical crop pick-up 18 feeds ground-borne crops upwardly to a bale or crop inlet 20 into a bale-forming chamber 24 that increases in diameter as the bale is formed. A transverse roller 22 assists in the formation of a bale core. See FIGS. 2 through 5. The bale-forming means is a system comprising a plurality of transverse rolls and an endless belt 26 trained thereabout. Part of this system includes a lower front roll 28, a lower rear roll 30, an intermediate front roll 32, an intermediate rear roll 34 and an upper roll 36. A belt stretch 38 extends from the roll 28 to the roll 32 and continues at 40 to the upper roll 36, returning thence downwardly at 42 to a web or stretch 44 to the lower rear roll 30. As will appear subsequently, the stretches 38 and 44 define an initial bale-forming chamber that increases in diameter as the crop is rolled into a bale of ever-increasing size until a predetermined size is attained.

The belt extends rearwardly from the lower rear roll 30 to a rearward lower roll 46, thence upwardly to a roll 48, upwardly and forwardly to a roll 50, down to a third intermediate roll 52, back up to a high roll 54, down to a forward roll 56 and back to the lower front roll 28. The rolls 30, 46 and 48 are carried by a gate means 58 which is essentially the rear portion of the main frame of the machine that is pivoted near the top of the side wall by a suitable pivot means 60. When the bale is completed (FIG. 5), the gate means is swung upwardly and rearwardly to a discharge position to enable rearward discharge of the completed bale. Any appropriate means may be provided for this purpose, such as a hydraulic unit 62 (only one shown in FIG. 1) at each side of the machine and typically connected hydraulically to the hydraulic system (not shown) of the towing tractor (also not shown).

Figure 2:
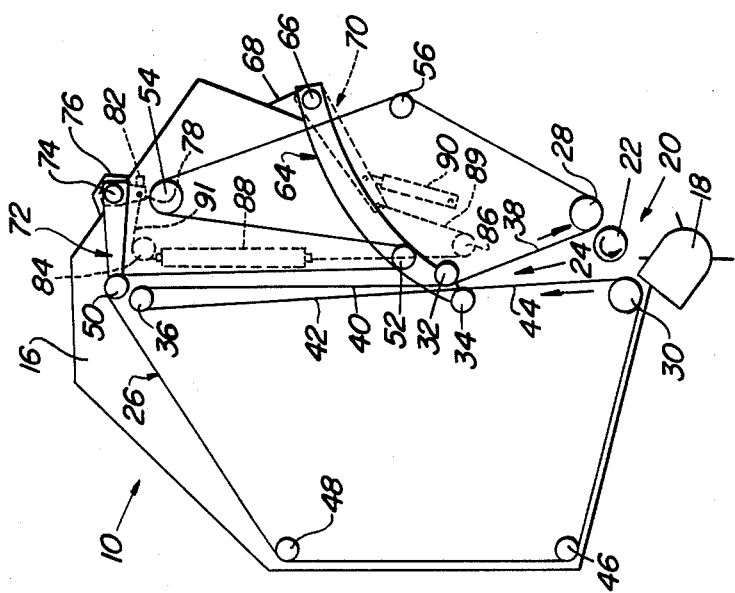
FIG. 2 is a side view, somewhat schematic and with the near side wall of the machine removed to expose the interior components but at the same time showing some of the important exterior components in dotted lines.

It is a feature of the invention that the three rolls 32, 34 and 52 are journalled on a carrier 64, here comprising a generally fore-and-aft arm just inwardly of each side wall and secured in common to a transverse pivot shaft 66 rockably carried by the respective sidewalls 14 and 16 as at 68. A lever arm means 70 is fixed to each end of the cross shaft 66 just outwardly of each side wall (FIG. 2 shows one such arm) and extends rearwardly. The top roll 50 is journaled on mounting means comprising a pair of interior lever arms 72 that are fixed to an upper rockshaft 74 pivoted near opposite ends at 76 on the main frame side walls. At each side of the machine, an outer lever arm means 78 is affixed to the near end of the rockshaft outwardly of the respective side wall. A chain and sprocket arrangement 80 interconnects the rockshaft lever arm 78 and the carrier means arm 70 at each side of the machine. See FIG. 1 for the near side. A stop 82 is provided for each rockshaft lever arm 78.

The flexible tension member arrangement selected here for the purpose of illustration includes an upper sprocket 84, a lower sprocket 86, a coiled tension spring 88, an upper chain 91 connected to the rockshaft lever arm 78 and trained about the upper sprocket and then connected to the upper end of the spring 88, and a lower chain 89 connected to the lower end of the spring, trained about the lower sprocket 86 and then connected to the free end of the carrier lever arm 70. The means 80 comprises part of control means for controlling the position of the rolls 32, 34 and 52 as the bale increases in size, it being noted that the spacing between the rolls 32 and 34 is narrow enough to prevent the bale from escaping upwardly as it is being formed. In other words, the rolls 32 and 34, together with their associated stretches of belt serve to confine the upper part of the bale, yielding together or as a unit to accommodate the ever-increasing size of the bale.

A further part of the control means, includes at each side of the machine, a hydraulic cylinder and piston unit 90 together with its hydraulic connections to the hydraulic system for example, of the towing tractor. This will be described in connection with FIG. 6.

Figure 6:
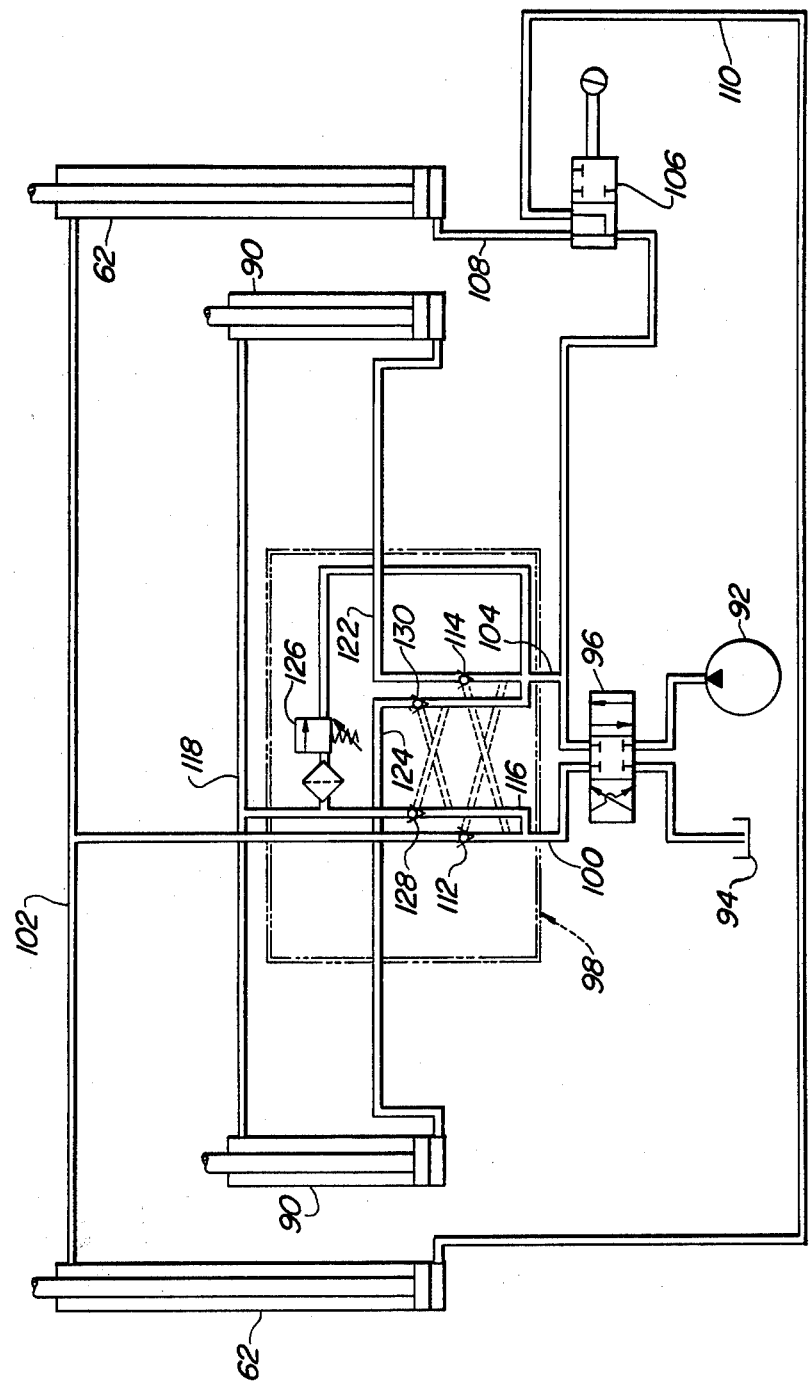
FIG. 6 is a diagrammatic view of a preferred form of hydraulic system used in density control and bale discharge.

A typical basic system such as those conventionally associated with agricultural tractors is shown in FIG. 6 as including a pump 92, reservoir 94 and main control valve 96. As also seen in FIG. 6, the cylinders 62 and 90 are connected in parallel through the intermediary of an intervening valve control means 98. Operation of the gate means cylinders 62 will be considered first. A line 100 leads from the control valve 96 to the upper ends of the cylinders 62 via branches 102. Pressurizing of these lines retracts the cylinders 62. Another line 104 leads from the control valve 96 to the lower ends of the cylinders 62 via a cut-off valve 106 (open in FIG. 6) and branches 108 and 110 to the lower ends of the cylinders 62 for extending the cylinders to open the gate (FIG. 5). When the cut-off valve 106 is closed, the gate cylinders will not extend or retract. A pilot-operated check valve 112 is provided in the line 102 to prevent leakage back through the control valve 96 when the gate means is closed. The dotted lines represent the pilot operation.

Operation of the control means cylinders 90 will now be covered. A line 116 leads off from the line 100 to the upper ends of the cylinders 90 via branches 118, and the line 104 leads to the lower ends of the cylinders 90 by means of branches 122 and 124. Adjustable relief valve means 126 (closed in FIG. 6) cross connects the lines 116 and 104. These lines respectively include check valve 128 to preclude leakage back through control valve 96, the dotted lines representing pilot operation of the check valve. Pilot-operated check valves 114 and 130 are provided to prevent retracting of the cylinders 90 unless the pump 92 is operating and the valve 96 is actuated. This system provides a separate line and check valve for each cylinder, which means that at least two components of the system must fail before both hydraulic cylinders can retract accidentally.

OPERATION

Figure 3:
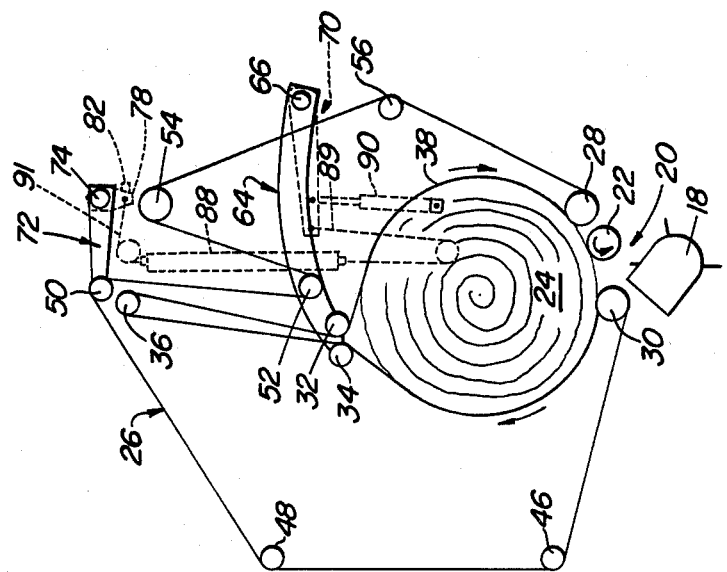
FIG. 3 is a similar view but illustrating a further state in bale formation.

The ground-borne crop is picked up by the pick-up 18 and fed to the inlet area 20. The belt stretches 38 and 44 travel in opposite directions (arrows) and start the rolling action to form the core of the bale. As more and more crop is fed via the inlet to the initial chamber 24, the rolling bale increases in size (FIGS. 3 and 4). In the infinite transition from, say, FIG. 2 through FIG. 4, the rolls 32, 34 and 52 move upwardly as the bale grows and as the carrier 64 moves upwardly under control of the cable-sheave-spring system and hydraulic cylinders 90. Bale density can be controlled by varying pressure on the cylinders 90.

The rolls 32 and 34 remain always above the bale during bale formation, during which stage the gate means remains fixed and thus the locations of the gate-carried rolls may be regarded as fixed. The rolls 32 and 34 function only to maintain bale envelopment. Although these rolls become closer to the bale as the bale grows, they do not exert any appreciable downward force on the bale because of the lifting force exerted by the upper roll lever arm 72 on the carrier roll 52. Actually, it has been found undesirable for the rolls 32 and 34 to exert a downward force on the bale because it causes an increase in power consumption without substantially increasing bale density. If power consumption is ignored, it is possible to increase density by changing the ratios such that the rolls 32 and 34 do exert a downward force on the bale.

Another function of the roll 50 is to compensate for cases of high peak power. The closer the carrier 64 is to the bale, the more power is required to turn or roll the bale. When such conditions exist, the resultant belt forces of the increased drive-induced tension exert an upward force on the rolls 32 and 34 to raise the carrier above the bale. When the bale is dumped (FIG. 5), cylinders 90 function to hold the carrier in an elevated position. This produces belt slack which is desirable for service as well as helping to reduce material build-up.

The advantages of the hydraulic means including the cylinders 90 and valving therefor are that the cylinders provide controlled resistance to upward movement of the carrier in a more efficient manner than springs alone; more constant belt tension and thus more uniform bale density and lower peak power requirements. The resistance to the cylinder system occurs as fluid is exchanged via the upper and lower ends thereof via the adjustable relief valve means 126. During normal bale formation, baler geometry is such that the belt is released by the rolls 32, 34 and 52 at the proper rate such that the roll 50 will remain against its stop 82 (FIG. 1). The spring 88 provides increasing force on the roll 50 as bale size increases to insure enough backside belt tension to prevent belt slippage. This is important because, if an inregular or lumpy bale contacts the rolls 32 and 34, the roll 50 must provide all of the backside tension necessary to drive the belt. When the bale is dumped, both cylinder units 62 and 90 are extended.

It will be understood that the belt system includes a plurality of side-by-side belts and that certain of the rolls are power driven, as from the power take-off shaft (not shown) of the towing tractor. It should also be observed that such expressions as "upper", "lower", etc., here as well as in the appended claims, are used as terms of convenience and not as terms of limitation, because, obviously, the elements could be otherwise oriented. Features and advantage of the invention, not described in detail herein, will be apparent to those skilled in the art, as will many modifications in the preferred embodiment disclosed, all without departure from the spirit and scope of the invention.

I claim:

1. A round baler having a main frame and including an endless belt and roll system providing first and second oppositely moving belt stretches to at least partly define a bale chamber, said system further including means for holding the stretches apart to define a crop inlet, first and second rolls spaced above the inlet and closely spaced apart to substantially close the upper part of the chamber and carrier means journalling the first and second rolls and mounted on the main frame for upward movement as the bale chamber grows and belt-tensioning mechanism characterized in that the belt-tensioning mechanism includes a third roll spaced above the first and second rolls and supporting a third belt stretch, means mounting the third roll on the main frame for movement toward and away from the carrier means, and means interconnecting the carrier means and the third roll mounting means for causing the third roll to move upwardly as the carrier means moves upwardly.

2. A round baler according to claim 1, further characterized in that the interconnecting means includes means for yieldably resisting upward movement of the carrier means.

3. A round baler according to claim 2, further characterized in that the yieldable resisting means is arranged in such manner that it exerts a belt-tensioning force on the third roll.

4. A round baler according to claim 3, further characterized in that hydraulic resistance means provides at least part of the yieldable resistance means.

5. A round baler according to claim 1, further characterized in that a fourth roll is journaled on the carrier means and receives part of the third belt stretch in such fashion that upward movement of the third roll exerts a lifting force on the carrier means via said part of the belt stretch.

6. A round baler according to claim 1, further characterized in that the carrier means is pivoted on the main frame on an axis spaced from and parallel to that of the first and second rolls and includes a force-receiving arm, the third roll mounting means includes a member rockable on an axis parallel to the aforesaid axis, and the interconnecting means extends between said member and the force-receiving arm.

7. A round baler according to claim 1, further characterized in the hydraulic means is provided for forcibly raising the carrier means to a level above the completed bale.

8. A round baler according to claim 1, further characterized in that the interconnecting means includes a two-way hydraulic cylinder and piston unit connected between the main frame and the carrier means and fluid line means including a relief valve interconnects opposite ends of the cylinder.

9. A round baler according to claim 1, further characterized in that the interconnecting means includes lever arm means connected to the carrier means, lever arm means connected to the third roll mounting means and spring means connected between the two lever arm means.

10. A round baler according to claim 1 wherein the main frame further includes gate means swingable between a closed position while the bale is being formed and an open position to discharge the bale when completed and hydraulic means for effecting swinging of the gate between its two positions, further characterized in that second hydraulic means is connected between the main frame and the carrier means to move the carrier means upwardly and the two hydraulic means are selectively operable conjointly to move the carrier means upwardly while swinging the gate means to its open position.

* * * * *